(No Model.)
G. C. FULLER.
REIN HOLDER.
No. 466,405. Patented Jan. 5, 1892.
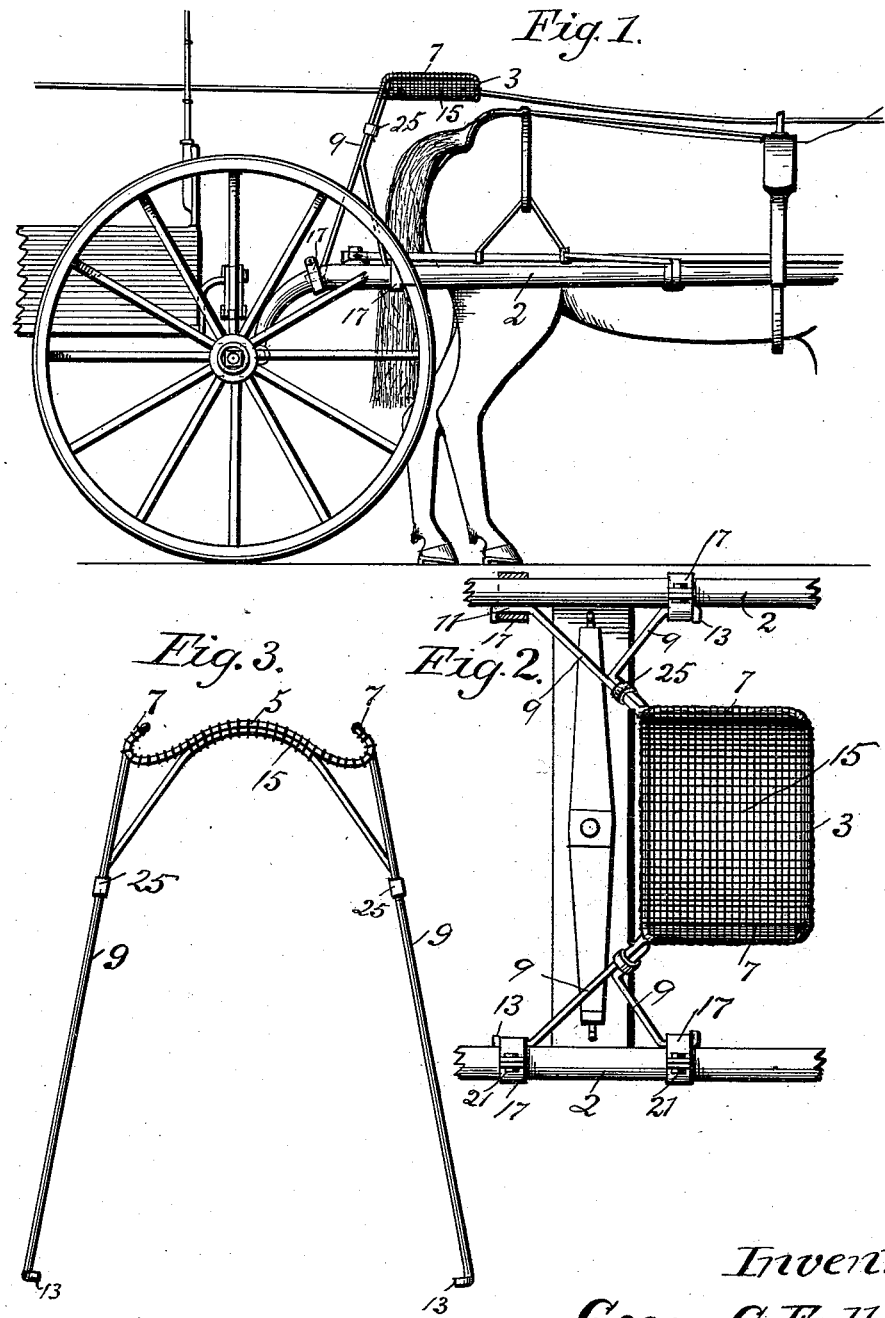

UNITED STATES PATENT OFFICE.

GEORGE C. FULLER, OF MINNEAPOLIS, MINNESOTA.

REIN-HOLDER.

SPECIFICATION forming part of Letters Patent No. 466,405, dated January 5, 1892.

Application filed February 28, 1891. Serial No. 383,302. (No model.)

*To all whom it may concern:*

Be it known that I, GEORGE C. FULLER, of Minneapolis, in the county of Hennepin and State of Minnesota, have invented certain Improvements in Rein-Guards, of which the following is a specification.

The object of this invention is to provide a device that may readily be attached to the thills, shafts, or pole of a buggy or carriage to guard the reins and prevent the horse from switching his tail over them.

The invention consists, generally, in the construction and combination hereinafter described, and particularly pointed out in the claim.

In the accompanying drawings, forming a part of this specification, Figure 1 is a side elevation of a portion of a carriage having my device applied thereto. Fig. 2 is a plan view, and Fig. 3 is a front elevation.

In the drawings, 2 represents the shafts or thills of a buggy or carriage which may be of any usual or ordinary construction. The rein-guard consists of a frame 3, provided with a raised central portion 5 and upturned ends 7. Supporting-rods 9 are preferably secured to or formed integrally with this frame, and they are provided with the portions 11, that extend lengthwise of the shafts, and the inturned ends or lugs 13. The frame itself is covered with a suitable netting or covering of wire-cloth 15 or other suitable material. The portions 11 of the brace-rods are adapted to come just inside the thills, as shown in Fig. 2, and they are secured to the thills by means of clamps 17, that pass around the thills, and are provided with the clamping-bolts 21. These clamps extend around the portions 11 of the supports of the frame, and they are held in position by the inturned ends of these supports. The rods forming the support at each side of the frame are preferably secured together by a suitable strap 25. The frame is held in position behind and above the horse, as shown in Fig. 1, and the reins rest upon the frame and are thus supported above the horse, so that it is impossible for the horse to switch his tail over the reins. The frame may be adjusted to any desired position on the thills by loosening the clamps and moving them together with the frame either forward or back, as desired.

I claim as my invention—

A rein-support comprising, in combination, an extended bearing-surface having the longitudinal raised middle portion and the upturned sides adapted to retain the reins and a frame extending around the edges thereof, two rods depending from each side of said frame and bracing against one another, the lower ends of said rods being provided with feet extending lengthwise of the thills, and clamps for adjustably securing said feet on the thills, four solid bearing-surfaces upon the thills being thereby provided for the rein-support, substantially as described.

In testimony whereof I have hereunto set my hand this 4th day of February, 1891.

GEORGE C. FULLER.

In presence of—
 A. C. PAUL,
 BESSIE BOOTH.